United States Patent

[11] 3,546,377

| [72] | Inventor | John Troll |
| | | Ridgefield, Connecticut |
| [21] | Appl. No. | 736,305 |
| [22] | Filed | June 12, 1968 |
| [45] | Patented | Dec. 8, 1970 |
| [73] | Assignee | Ovitron Corporation |
| | | Cheshire, Connecticut |
| | | a corporation of Delaware |

[54] VIDEO COMPARATOR USING VIDICONS WITH DELAYED SCANNING
2 Claims, 2 Drawing Figs.

[52] U.S. Cl. .................................................. 178/6.8, 178/7.7, 356/168
[51] Int. Cl. ................................................... H04n 3/30, H04n 7/18

[50] Field of Search ............................................. 178/6(Ind), 7.7, 6.8; 356/168

[56] References Cited
UNITED STATES PATENTS
3,049,588 8/1962 Barnett........................ 178/6(IND)

*Primary Examiner*—Richard Murray
*Assistant Examiner*—Howard W. Britton
*Attorney*—Hopgood and Calimafde ABSTRACT: A pair of vidicons are employed to scan sample and standard profiles, respectively. The two vidicon outputs are synchronized in time and compared through a differential comparator. A comparator signal which is above a predetermined threshold is employed to indicate the lack of coincidence and rejection of the sample.

INVENTOR.
JOHN TROLL
BY
Hopgood & Calimafde
ATTORNEYS

VIDEO COMPARATOR USING VIDICONS WITH DELAYED SCANNING

BACKGROUND OF INVENTION

This invention pertains generally to the evaluation of unit profiles and in particular to the rejection of such profiles that do not meet a predetermined standard.

The conventional evaluation of unit profiles such as wire diameters, bullet cross sections, necking area of fuses, and so on, take many forms. One such arrangement calls for a programming of the unit standard; comparisons are then made against the program and a deviation from the program results in an indication of rejection. This programming type of arrangement accommodates the "standard signal" either in a computer sense where digitalized units give an analogue response for the "standard signal" or as a stored (for example, magnetically stored) signal to be summoned by a code word.

In either event, the system tends to become cumbersome where several different types of unit profiles are being inspected and each profile calls for a separate program. These arrangements are further extremely slow in that it is not possible to expeditiously adapt to new unprogrammed units.

The mechanical evaluation of samples even more acutely displays the foregoing disadvantages. Here a mechanical-type programming is involved. For example, automated micrometer readings or masking techniques are programmed which require significant set up procedures in order to evaluate each particular unit. Needless to say, such an arrangement also required substantially greater time considerations in changing programs to accommodate different units.

OBJECTS

Accordingly, it is the object of this invention to provide an arrangement for evaluating the profile of unit samples in a simple automatic and economic manner.

It is the further object of this invention to accomplish the foregoing object with apparatus exhibiting a quick response.

And, it is a still further object of this invention to accomplish the foregoing objects with an apparatus which is extremely flexible, and which is capable of evaluating different samples against correspondingly different standards with minimum transition time.

SUMMARY OF INVENTION

Briefly, the invention is predicated upon the concept of comparing the output signals of a pair of vidicons one of which scans the sample and the other which scans the standard. Suitable means are employed to ensure synchronism of the vidicons. A threshold device monitors the output of a differential comparator coupled to the respective vidicons. Any signal exceeding the threshold indicates a rejected sample.

The above mentioned and other features and objects of this invention and the manner of attaining them will become more apparent and the invention itself will best be understood by reference to the following description of embodiments of the invention taken in conjunction with the accompanying drawing, the description of which follows.

DETAILED DESCRIPTION OF THE INVENTION

For the purposes of illustration, the invention shall be described with reference to the comparison of a sample bullet with a standard. It is to be clearly understood, however, that the invention applies with like import to any unit which offers sufficient background contrast to be evaluated. Thus, for example, even the label applied to a medicine bottle could be scanned for relative position or content. The word "profile" as used herein is intended to include not only physical or spatial profiles, but also black, white, and color variation profiles.

Figure 1:
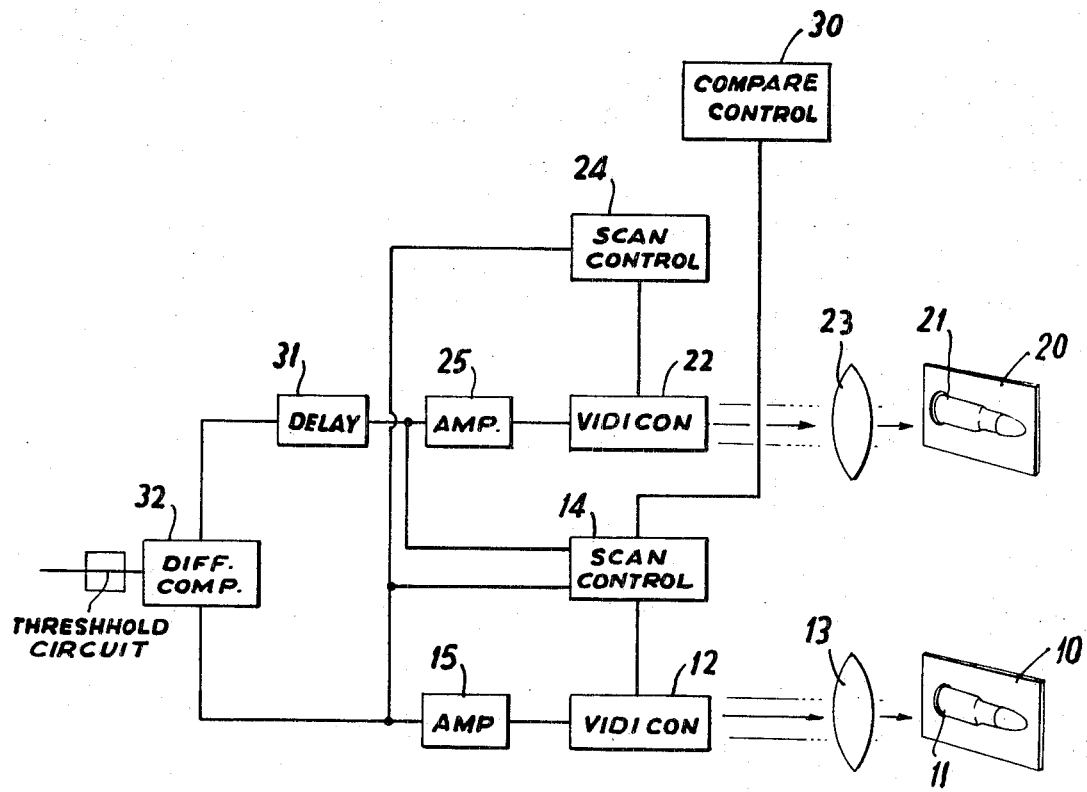
FIG. 1 is a block diagram of one embodiment of the inventive arrangement.

Turning now to FIG. 1, a standard bullet 11 is placed against a suitable backdrop 10 selected for its contrast. With light emanating from the forefront of the drawing, backdrop 10 would preferably be a highly light absorbent material such as black felt. Sample bullet 21 is likewise placed against a similar backdrop 20.

While the illustration shows an ideal situation it will be appreciated that the bullet may in fact be positioned anywhere along the production line against such a backdrop. The standard bullet would be oriented as closely as possible to that of the sample.

A pair of lenses 13 and 23 focus the respective images of the two bullets on the faces of a pair of vidicons 12 and 22, respectively. The vidicon is a small television camera tube offering 600 line resolution and it is both small in size and simple in construction. The tube includes a signal electrode composed of a transparent conducting film on the inner surface of the face plate and a thin layer of photoconductor material deposited on the signal electrode. Each elemental area of the photoconductor may be analogized to a leaky capacitor with one plate electrically connected to the signal electrode and the other plate floating except when commutated by the electron beam.

Initially, the gun side of the photoconductive surface is charged to cathode potential by the electron gun thus leaving a charge on each elemental capacitor. During the scan these capacitors discharge in accordance with the value of their leakage resistance which is in turn determined by the amount of light falling on that area. Hence, there appears on the gun side of the photoconductive surface a positive potential pattern corresponding to the pattern of light from the scene imaged on the opposite surface or face of the vidicon.

It will be appreciated by those skilled in the art numerous other grids and coils are included to provide the proper fields, beam velocity, scan, and output signals. Suffice to say that each vidicon will, by these means, scan 600 times horizontally (each time in a different vertical position) for each frame.

Figure 2:
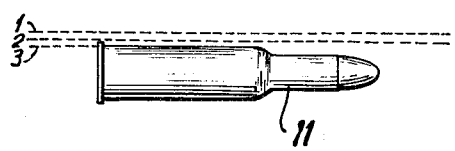
FIG. 2 shows the initial scan of a unit standard; in this case a bullet.

FIG. 2, which is not necessarily to scale, indicates the first two and a fraction scan lines. The reason for breaking the third scan line will become apparent as the description proceeds.

When it is desired to effect a comparison between the standard 11 in sample 21, comparison control 31 is energized (this may be automatically or manually) signalling a conventional scan control 14 for vidicon 12. Vidicon 12 commences its high resolution scan as shown in FIG. 2 until the first output signal indicates that a scan of the unit profile has been commenced. As shown in FIG. 2, this will be partway through the third horizontal scan line. This signal is suitably amplified in amplifier 15 and is fed back to the scan control to introduce a quiescent state and hold further scanning.

Simultaneously, this signal is employed to trigger scan control 24 of vidicon 22 which similarly commences its scan of bullet 21. Scan 24 continues until the first output of the vidicon 22, through amplifier 25, indicates that it has made its incipient scan of the bullet. The output of amplifier 25 is employed to reestablish the scanning of the standard bullet by vidicon 12. Thus, both scans are now proceeding at approximate synchronization. Precise synchronization may be achieved by a suitable delay 31. The two amplified vidicon signals are now fed to a differential comparator 32, which may be of the conventional differential amplifier type where the output responds to the difference between the inputs. The output of the differential comparator is fed to any conventional threshold device whose parametric value is set depending upon the tolerance requirements of the sample. If this threshold is exceeded, a reject signal may either be annunciated or automatically employed to reject the sample.

While the principles of the invention have been described in connection with specific apparatus, it is to be clearly understood that this description is made only by way of example and not as a limitation to the scope of the invention as set forth in the objects thereof.

I claim:

1. Apparatus for evaluating the profile of a unit sample comprising:

a pair of vidicons;

means for focusing the profile of a unit sample object and a unit standard object on said vidicons respectively;

means for initiating the scanning of one of said sample and said standard by the associated one of said vidicons;

means coupled to the scanning vidicon and responsive to a signal indicating the intersection of the object profile to halt the scanning thereof and initiate the scanning of the other of said sample and standard by the other of said vidicons;

means for reinitiating the scanning of the halted vidicon in response to a signal indicating object profile intersection by said other vidicon; and means for comparing the output of said vidicons and indicating absences of coincidence.

2. The apparatus claimed in claim 1, wherein said means for comparing the output of said vidicons comprises threshold means for indicating the rejection of a sample when the comparison of the signals received from said vidicons exceeds a predetermined threshold.